(12) United States Patent
Webber et al.

(10) Patent No.: US 8,217,833 B2
(45) Date of Patent: Jul. 10, 2012

(54) GNSS SUPERBAND ASIC WITH SIMULTANEOUS MULTI-FREQUENCY DOWN CONVERSION

(75) Inventors: Mark R. Webber, Gilbert, AZ (US); Bradley P. Badke, Chandler, AZ (US); Walter J. Feller, Airdrie (CA); Steven R. Miller, Scottsdale, AZ (US)

(73) Assignee: Hemisphere GPS LLC, Calgary, Alberta (CA)

( * ) Notice: Subject to any disclaimer, the term of this patent is extended or adjusted under 35 U.S.C. 154(b) by 186 days.

(21) Appl. No.: 12/635,527

(22) Filed: Dec. 10, 2009

(65) Prior Publication Data
US 2010/0176991 A1    Jul. 15, 2010

Related U.S. Application Data

(60) Provisional application No. 61/121,831, filed on Dec. 11, 2008.

(51) Int. Cl.
*G01S 19/35* (2010.01)
(52) U.S. Cl. .................................. 342/357.75
(58) Field of Classification Search ... 342/357.2–357.78
See application file for complete search history.

(56) References Cited

U.S. PATENT DOCUMENTS

| | | | |
|---|---|---|---|
| 3,585,537 A | 6/1971 | Rennick et al. |
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |

(Continued)

FOREIGN PATENT DOCUMENTS
JP    07244150    9/1995

(Continued)

OTHER PUBLICATIONS

Takac, Frank et al., "SmartRTK: A Novel Method of Processing Standardised RTCM Network RTK Information for High Precision Positioning" *Proceedings of ENC GNSS 2008*, Toulouse, France,(Apr. 22, 2008).

(Continued)

*Primary Examiner* — Thomas Tarcza
*Assistant Examiner* — Nga X Nguyen
(74) *Attorney, Agent, or Firm* — Law Office of Mark Brown, LLC; Mark E. Brown

(57) ABSTRACT

A multi-frequency down converter includes first and second signal paths. A common local oscillator/synthesizer drives both of the signal paths. Exemplary applications include GNSS systems operating across superbands. The down converter is adapted for use in a GNSS receiver system.

34 Claims, 5 Drawing Sheets

U.S. PATENT DOCUMENTS

| | | | |
|---|---|---|---|
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,814,036 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Englemayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A * | 5/2000 | Silvestrin et al. ........ 342/357.27 |
| 6,076,612 A | 6/2000 | Carr et al. |
| 6,081,171 A | 6/2000 | Ella |
| 6,100,842 A | 8/2000 | Dreier et al. |
| 6,104,978 A | 8/2000 | Harrison et al. |
| 6,122,595 A | 9/2000 | Varley et al. |
| 6,128,574 A | 10/2000 | Diekhans |
| 6,144,335 A | 11/2000 | Rogers |
| 6,191,730 B1 | 2/2001 | Nelson, Jr. |
| 6,191,733 B1 | 2/2001 | Dizchavez |
| 6,198,430 B1 | 3/2001 | Hwang et al. |

| | | |
|---|---|---|
| 6,198,992 B1 | 3/2001 | Winslow |
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 | 5/2002 | Whitehead |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Ahearn et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,394 B1 | 10/2003 | Ronkka et al. |
| 6,631,916 B1 | 10/2003 | Miller |
| 6,643,576 B1 | 11/2003 | O'Connor et al. |
| 6,646,603 B2 | 11/2003 | Dooley et al. |
| 6,657,875 B1 | 12/2003 | Zeng et al. |
| 6,671,587 B2 | 12/2003 | Hrovat et al. |
| 6,686,878 B1 | 2/2004 | Lange |
| 6,688,403 B2 | 2/2004 | Bernhardt et al. |
| 6,703,973 B1 | 3/2004 | Nichols |
| 6,711,501 B2 | 3/2004 | McClure et al. |
| 6,721,638 B2 | 4/2004 | Zeitler |
| 6,732,024 B2 | 5/2004 | Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,816,539 B1 * | 11/2004 | Rog .................. 375/147 |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka et al. |
| 6,900,992 B2 | 5/2005 | Kelly et al. |
| 6,922,635 B2 | 7/2005 | Rorabaugh |
| 6,931,233 B1 | 8/2005 | Tso et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,155,335 B2 | 12/2006 | Rennels |
| 7,162,348 B2 | 1/2007 | McClure et al. |
| 7,191,061 B2 | 3/2007 | McKay et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altman |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,428,259 B2 | 9/2008 | Wang et al. |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,100 B2 | 4/2009 | Yang et al. |
| 7,571,029 B2 | 8/2009 | Dai et al. |
| 7,689,354 B2 | 3/2010 | Heiniger et al. |
| 2003/0014171 A1 | 1/2003 | Ma et al. |
| 2003/0187560 A1 | 10/2003 | Keller et al. |
| 2003/0208319 A1 | 11/2003 | Ell et al. |
| 2004/0039514 A1 | 2/2004 | Steichen et al. |
| 2004/0212533 A1 | 10/2004 | Whitehead et al. |
| 2005/0080559 A1 | 4/2005 | Ishibashi et al. |
| 2005/0225955 A1 | 10/2005 | Grebenkemper et al. |
| 2005/0265494 A1 | 12/2005 | Goodlings |
| 2006/0031664 A1 | 2/2006 | Wilson et al. |
| 2006/0167600 A1 | 7/2006 | Nelson et al. |
| 2006/0206246 A1 | 9/2006 | Walker |
| 2006/0215739 A1 | 9/2006 | Williamson et al. |
| 2007/0078570 A1 | 4/2007 | Dai et al. |
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2009/0171583 A1 | 7/2009 | DiEsposti |
| 2009/0174597 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |

| | | | |
|---|---|---|---|
| 2010/0026569 A1 | 2/2010 | Amidi | |
| 2010/0030470 A1 | 2/2010 | Wang et al. | |
| 2010/0039316 A1 | 2/2010 | Gronemeyer et al. | |
| 2010/0039318 A1 | 2/2010 | Kmiecik et al. | |
| 2010/0039320 A1 | 2/2010 | Boyer et al. | |
| 2010/0039321 A1 | 2/2010 | Abraham | |
| 2010/0060518 A1 | 3/2010 | Bar-Sever et al. | |
| 2010/0063649 A1 | 3/2010 | Wu | |
| 2010/0084147 A1 | 4/2010 | Aral | |
| 2010/0085249 A1 | 4/2010 | Ferguson et al. | |
| 2010/0085253 A1 | 4/2010 | Ferguson et al. | |
| 2010/0103033 A1 | 4/2010 | Roh | |
| 2010/0103034 A1 | 4/2010 | Tobe et al. | |
| 2010/0103038 A1 | 4/2010 | Yeh et al. | |
| 2010/0103040 A1 | 4/2010 | Broadbent | |
| 2010/0106414 A1 | 4/2010 | Whitehead | |
| 2010/0106445 A1 | 4/2010 | Kondoh | |
| 2010/0109944 A1 | 5/2010 | Whitehead et al. | |
| 2010/0109945 A1 | 5/2010 | Roh | |
| 2010/0109947 A1 | 5/2010 | Rintanen | |
| 2010/0109948 A1 | 5/2010 | Razoumov et al. | |
| 2010/0109950 A1 | 5/2010 | Roh | |
| 2010/0111372 A1 | 5/2010 | Zheng et al. | |
| 2010/0114483 A1 | 5/2010 | Heo et al. | |
| 2010/0117894 A1 | 5/2010 | Velde et al. | |
| 2010/0117899 A1 | 5/2010 | Papadimitratos et al. | |
| 2010/0117900 A1 | 5/2010 | van Diggelen et al. | |
| 2010/0124210 A1 | 5/2010 | Lo | |
| 2010/0124212 A1 | 5/2010 | Lo | |
| 2010/0134354 A1 | 6/2010 | Lennen | |
| 2010/0149025 A1 | 6/2010 | Meyers et al. | |
| 2010/0149030 A1 | 6/2010 | Verma et al. | |
| 2010/0149033 A1 | 6/2010 | Abraham | |
| 2010/0149034 A1 | 6/2010 | Chen | |
| 2010/0149037 A1 | 6/2010 | Cho | |
| 2010/0150284 A1 | 6/2010 | Fielder et al. | |
| 2010/0152949 A1 | 6/2010 | Nunan et al. | |
| 2010/0156709 A1 | 6/2010 | Zhang et al. | |
| 2010/0156712 A1 | 6/2010 | Pisz et al. | |
| 2010/0156718 A1 | 6/2010 | Chen | |
| 2010/0159943 A1 | 6/2010 | Salmon | |
| 2010/0161179 A1 | 6/2010 | McClure et al. | |
| 2010/0161211 A1 | 6/2010 | Chang | |
| 2010/0161568 A1 | 6/2010 | Xiao | |
| 2010/0171660 A1 | 7/2010 | Shyr et al. | |
| 2010/0171757 A1 | 7/2010 | Melamed | |
| 2010/0185364 A1 | 7/2010 | McClure | |
| 2010/0185366 A1 | 7/2010 | Heiniger et al. | |
| 2010/0185389 A1 | 7/2010 | Woodard | |
| 2010/0188285 A1 | 7/2010 | Collins | |
| 2010/0188286 A1 | 7/2010 | Bickerstaff et al. | |
| 2010/0189163 A1 | 7/2010 | Burgi et al. | |
| 2010/0207811 A1 | 8/2010 | Lackey | |
| 2010/0210206 A1 | 8/2010 | Young | |
| 2010/0211248 A1 | 8/2010 | Craig et al. | |
| 2010/0211315 A1 | 8/2010 | Toda | |
| 2010/0211316 A1 | 8/2010 | DaSilva | |
| 2010/0220004 A1 | 9/2010 | Malkos et al. | |
| 2010/0220008 A1 | 9/2010 | Conover et al. | |
| 2010/0222076 A1 | 9/2010 | Poon et al. | |
| 2010/0225537 A1 | 9/2010 | Abraham | |
| 2010/0228408 A1 | 9/2010 | Ford | |
| 2010/0228480 A1 | 9/2010 | Lithgow et al. | |
| 2010/0231443 A1 | 9/2010 | Whitehead | |
| 2010/0231446 A1 | 9/2010 | Marshall et al. | |
| 2010/0232351 A1 | 9/2010 | Chansarkar et al. | |
| 2010/0235093 A1 | 9/2010 | Chang | |
| 2010/0238976 A1 | 9/2010 | Young | |
| 2010/0241347 A1 | 9/2010 | King et al. | |
| 2010/0241353 A1 | 9/2010 | Park | |
| 2010/0241441 A1 | 9/2010 | Page et al. | |
| 2010/0241864 A1 | 9/2010 | Kelley et al. | |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO-2010005945 | 7/2009 |
| WO | WO2009126587 | 10/2009 |
| WO | WO2009/148638 | 12/2009 |
| WO | WO-2010/042131 | 4/2010 |
| WO | WO-2010104782 | 9/2010 |

OTHER PUBLICATIONS

"International Search Report", PCT/US09/33567, (Feb. 9, 2009).
"International Search Report and Written Opinion", PCT/IB2008/003796, (Jul. 15, 2009).
"International Search Report,", PCT/US09/34376, (Nov. 2, 2009).
Parkinson, Bradford W., et al., "Global Positioning System: Theory and Applications, vol. II", *Bradford W. Parkinson and James J. Spiker, Jr., eds., Global Postioning System: Theory and Applicaitons*, vol. II, 1995, AIAA, Reston, VA, USA, pp. 3-50, (1995),3-50.
"Orthman Manufacturing Co., www.orthman.com/htm;guidance.htm", 2004, regarding the "Tracer Quick-Hitch".
Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1*, Monetrey. California American Institute of Aeronautics and Astronautics, Inc., (May 2004),136-143.
Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).
Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.
Park, Chansik et al., "Integer Ambiguity Resolution for GPS Based Attitude Determination System", *SICE* Jul. 29-31, 1998, Chiba, 1115-1120.
Last, J. D., et al., "Effect of skywave interference on coverage of radiobeacon DGPS stations", *IEEE Proc.-Radar, Sonar Navig.*, vol. 144, No. 3, Jun. 1997, pp. 163-168.
"International Search Report and Written Opinion", PCT/US2004/015678, filed May 17, 2004, Jun. 21, 2005.
"ISO", 11783 Part 7 Draft Amendment 1 Annex, Paragraphs B.6 and B.7.ISO 11783-7 2004 DAM1, ISO: Mar. 8, 2004.
Kaplan, E D., "Understanding GPS: Principles and Applications", *Artech House*, MA, 1996.
Irsigler, M et al., "PPL Tracking Performance in the Presence of Oscillator Phase Noise", *GPS Solutions*, vol. 5, No. 4, pp. 45-57 (2002).
Ward, Phillip W., "Performance Comparisons Between FLL, PLL and a Novel FLL-Assisted-PLL Carrier Tracking Loop Under RF interference Conditions", *11th Int. Tech Meeting of the Satellite Division of the U.S. Inst. of Navigation*, Nashville, TN, Sep. 15-18, 783-795, 1998.
Bevly, David M., "Comparison of INS v. Carrier-Phase DGPS for Attitude Determination in the Control of Off-Road Vehicles", *ION 55th Annual Meeting*; Jun. 28-30, 1999. Cambridge, Massachusetts: pp. 497-504.
Keicher, R. et al., "Automatic Guidance for Agricultural Vehicles in Europe", *Computers and Electronics in Agriculture*, vol. 25, (Jan. 2000), 169-194.
"International Search Report", PCT/US09/49776, (Aug. 11, 2009).
"International Search Report", PCT/AU/2008/000002, (Feb. 28, 2008).
"International Search Report", PCT/US09/33693 (Mar. 30, 2009).
"International Search Report", PCT/US09/039686 (May 26, 2009).
"International Search Report / Written Opinion", PCT/US09/63594, (Jan. 11, 2010).
"International Search Report", PCT/US09/60668, (Dec. 9, 2009).
"International Search Report", PCT/US09/067693, (Jan. 26, 2010).
"International Search Report and Written Opinion", PCT/US10/21334, (Mar. 12, 2010).
Rho, Hyundho et al., "Dual-Frequency GPS Precise Point Positioning with WADGPS Corrections", [retrieved on May 18, 2010]. Retrieved from the Internet: URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: http://www.icao.int/icao/en/ro/nacc/meetings/2004/gnss/documentation/Pegasus/tn.pdf>, (Dec. 7, 2004), p. 89 paras[0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>, (May 8, 2006).

"International Search Report", PCT/US10/26509 (Apr. 20, 2010).

"International Search Report and Written Opinion", *International Searching Authortiy*, PCT/US08/88070, Feb. 9, 2009.

"ISR Notification & Written Opinion", PCT/US10/26509, (Apr. 20, 2010),1-7.

"Notification Concerning Transmittal of International Preliminary Report on Patentability", PCT/US2009/049776, (Jan. 20, 2011).

"Notification Concerning Transmittal of International Report on Patentability (PCT)", PCT/US2009/049776, (Jan. 20, 2011).

"International Search Report and Written Opinion", PCT/US08/81727, (Dec. 23, 2008).

* cited by examiner

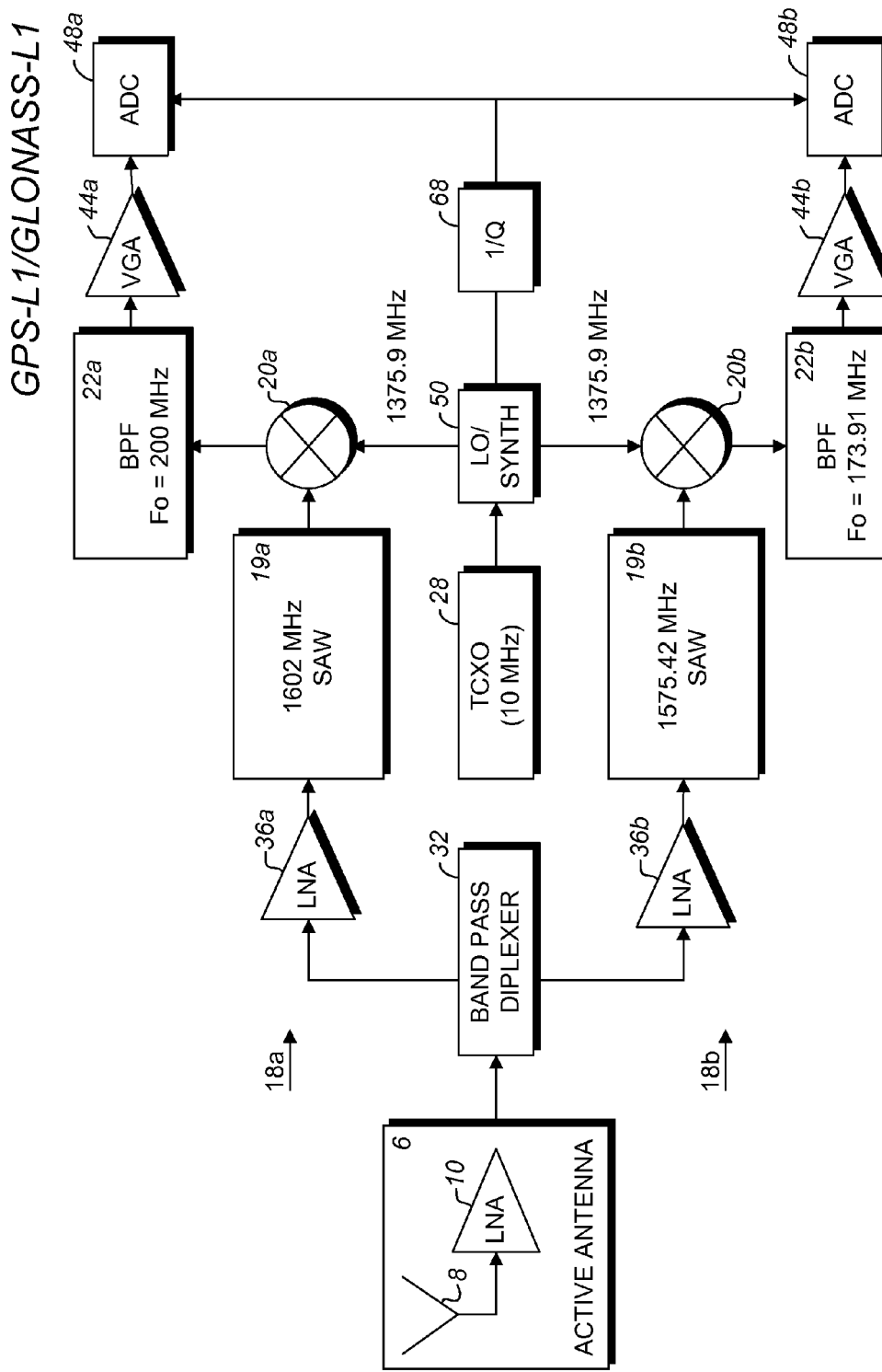

GNSS SUPERBAND ASIC WITH SIMULTANEOUS MULTI-FREQUENCY DOWN CONVERSION

CROSS-REFERENCE TO RELATED APPLICATION

This application claims priority in U.S. Provisional Patent Application No. 61/121,831, filed Dec. 11, 2008, which is incorporated herein by reference.

BACKGROUND OF THE INVENTION

1. Field of the Invention

The present invention relates generally to global navigation satellite systems (GNSS) receiver technology, and in particular to an application-specific integrated circuit (ASIC) for down-converting dual frequency signals from a GNSS frequency superband simultaneously.

2. Description of the Related Art

Global navigation satellite systems (GNSS) include the Global Positioning System (GPS), which was established by the United States government and employs a constellation of 24 or more satellites in well-defined orbits at an altitude of approximately 26,500 km. These satellites continually transmit microwave L-band radio signals in three frequency bands, centered at 1575.42 MHz, 1227.60 MHz and 1176.45 MHz, denoted as L1, L2 and L5 respectively. All GNSS signals include timing patterns relative to the satellite's onboard precision clock (which is kept synchronized by a ground station) as well as a navigation message giving the precise orbital positions of the satellites. GPS receivers process the radio signals, computing ranges to the GPS satellites, and by triangulating these ranges, the GPS receiver determines its position and its internal clock error. Different levels of accuracies can be achieved depending on the techniques employed.

GNSS also includes Galileo (Europe), the GLObal NAvigation Satellite System (GLONASS, Russia), Beidou (China), Compass (proposed), the Indian Regional Navigational Satellite System (IRNSS) and QZSS (Japan, proposed). Galileo will transmit signals centered at 1575.42 MHz, denoted L1 or E1, 1176.45 denoted E5a, 1207.14 MHz, denoted E5b, 1191.795 MHz, denoted E5 and 1278.75 MHz, denoted E6. GLONASS transmits groups of FDM signals centered approximately at 1602 MHz and 1246 MHz, denoted GL1 and GL2 respectively. QZSS will transmit signals centered at L1, L2, L5 and E6. Groups of GNSS signals are herein grouped into "superbands".

To gain a better understanding of the accuracy levels achievable by using GNSS, it is necessary to understand the types of signals available from the GNSS satellites. One type of signal includes both the coarse acquisition (C/A) code, which modulates the L1 radio signal, and the precision (P) code, which modulates both the L1 and L2 radio signals. These are pseudorandom digital codes that provide a known pattern that can be compared to the receiver's version of that pattern. By measuring the time-shift required to align the pseudorandom digital codes, the GNSS receiver is able to compute an unambiguous pseudo-range to the satellite. Both the C/A and P codes have a relatively long "wavelength," of about 300 meters (1 microsecond) and 30 meters (1/10 microsecond), respectively. Consequently, use of the C/A code and the P code yield position data only at a relatively coarse level of resolution.

The second type of signal utilized for position determination is the carrier signal. The term "carrier," as used herein, refers to the dominant spectral component which remains in the radio signal after the spectral content caused by the modulated pseudorandom digital codes (C/A and P) is removed. The L1 and L2 carrier signals have wavelengths of about 19 and 24 centimeters, respectively. The GNSS receiver is able to "track" these carrier signals, and in doing so, make measurements of the carrier phase to a small fraction of a complete wavelength, permitting range measurement to an accuracy of less than a centimeter.

In stand-alone GNSS systems that determine a receiver's position coordinates without reference to a nearby reference receiver, the process of position determination is subject to errors from a number of sources. These include errors in the satellite's clock reference, the location of the orbiting satellite, ionospheric-induced propagation delay errors, and tropospheric refraction errors. A more detailed discussion of these sources of error is provided in U.S. Pat. No. 5,828,336 by Yunck, et al.

To overcome the errors of stand-alone GNSS, many kinematic positioning applications make use of multiple GNSS receivers. A reference receiver located at a reference site having known coordinates receives the satellite signals simultaneously with the receipt of signals by a remote receiver. Depending on the separation distance, many of the errors mentioned above will affect the satellite signals equally for the two receivers. By taking the difference between signals received both at the reference site and at the remote location, these errors are effectively eliminated. This facilitates an accurate determination of the remote receiver's coordinates relative to the reference receiver's coordinates. The technique of differencing signals is known in the art as differential GNSS (DGNSS). The combination of DGNSS with precise measurements of carrier phase leads to position accuracies of less than one centimeter root-mean-squared (centimeter-level positioning). When DGNSS positioning utilizing carrier phase is done in real-time while the remote receiver is potentially in motion, it is often referred to as Real-Time Kinematic (RTK) positioning.

One of the difficulties in performing RTK positioning using carrier signals is the existence of an inherent ambiguity that arises because each cycle of the carrier signal looks exactly alike. Therefore, a range measurement based upon carrier phase has an ambiguity equivalent to an integral number of carrier signal wavelengths. Various techniques are used to resolve the ambiguity, often with some form of double-differencing. The prior art related to this includes U.S. Pat. No. 4,170,776 by MacDoran, U.S. Pat. No. 4,667,203 by Counselman, U.S. Pat. No. 4,963,889 by Hatch, U.S. Pat. No. 5,296,861 by Knight, and U.S. Pat. No. 5,519,620 by Talbot et al. Once ambiguities are solved, however, the receiver continues to apply a constant ambiguity correction to a carrier measurement until loss of lock on that carrier signal. Regardless of the technique employed, the problem of solving integer ambiguities, in real-time, is always faster and more robust if there are more measurements upon which to discriminate the true integer ambiguities. Robust means that there is less chance of choosing an incorrect set of ambiguities. The degree to which the carrier measurements collectively agree to a common location of the GNSS receiver is used as a discriminator in choosing the correct set of ambiguities. The more carrier phase measurements that are available, the more likely it is that the best measure of agreement will correspond to the true (relative to the reference GNSS) position of the remote GNSS receiver.

One method, which effectively gives more measurements, is to use dual frequency (DF) receivers for tracking delta-range measurements from P code modulation on the L1 and L2 carriers simultaneously with the L1 C/A code generating code phase measurements. The L1 and L2 carriers are modulated with codes that leave the GNSS satellite at the same time. Since the ionosphere produces different delays for radio carriers of different frequencies, such dual frequency receivers can be used to obtain real-time measurements of ionospheric delays at various receiver positions. The L1 and L2 ranging measurements are combined to create a new L1 ranging measurement that has an ionospheric delay of the same sign as the ionosphere delay in the L1 pseudorange. Accurate ionospheric delay information, when used in a position solution, can help produce more accuracy. Absent such real-time ionospheric delay measurements, other correction techniques are commonly used, such as differential GNSS (DGNSS), proprietary third party satellite augmentation system (SAS) services available on a paid subscription basis, or the U.S.-sponsored Wide Area Augmentation System (WAAS).

As compared to single-frequency (typically L1) receiver systems, previous dual-frequency receiver systems have tended to be relatively expensive because of their additional components for accommodating L2 measurements. Moreover, the additional components tended to consume more power and required additional space. Still further, dual-frequency receivers should be adaptable for use with all present and projected GNSS, transmitting signals which can be grouped into two "superbands" of radio signal frequencies generally in the range of about 1160 MHz to 1250 MHz and 1525 MHz to 1613 MHz. Accordingly, a preferred multi-frequency receiver should be: a single, application-specific integrated circuit (ASIC); programmable for down converting various pairs of frequencies; minimally-sized; and capable of operating with minimal power.

SUMMARY OF THE INVENTION

In the practice of an aspect of the present invention, a multi-frequency down conversion ASIC is provided in a GNSS receiver system. The receiver system can include an active antenna inputting amplified GNSS signals to the down converter ASIC, which outputs digital signals to a correlator ASIC, which in turn provides digital signals to a GNSS solution processor. The down converter ASIC has dual frequency channels driven by a common local oscillator/synthesizer (LO/Synth) and synchronized ADC clocks. External matching and filtering components, including bandpass filters, maximize performance and accommodate frequencies in the superband for compatibility with all GNSS.

BRIEF DESCRIPTION OF THE DRAWINGS

FIG. 5 is a schematic diagram of an alternative embodiment of the present invention, shown configured for GPS-L1/GLONASS-L1.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

Global navigation satellite systems (GNSS) are broadly defined to include the Global Positioning System (GPS, U.S.), Galileo (proposed, Europe), GLONASS (Russia), Beidou (China), Compass (proposed), the Indian Regional Navigational Satellite System (IRNSS), QZSS (Japan, proposed) and other current and future positioning technology using signals from satellites, with or without augmentation from terrestrial sources.

Figure 1:
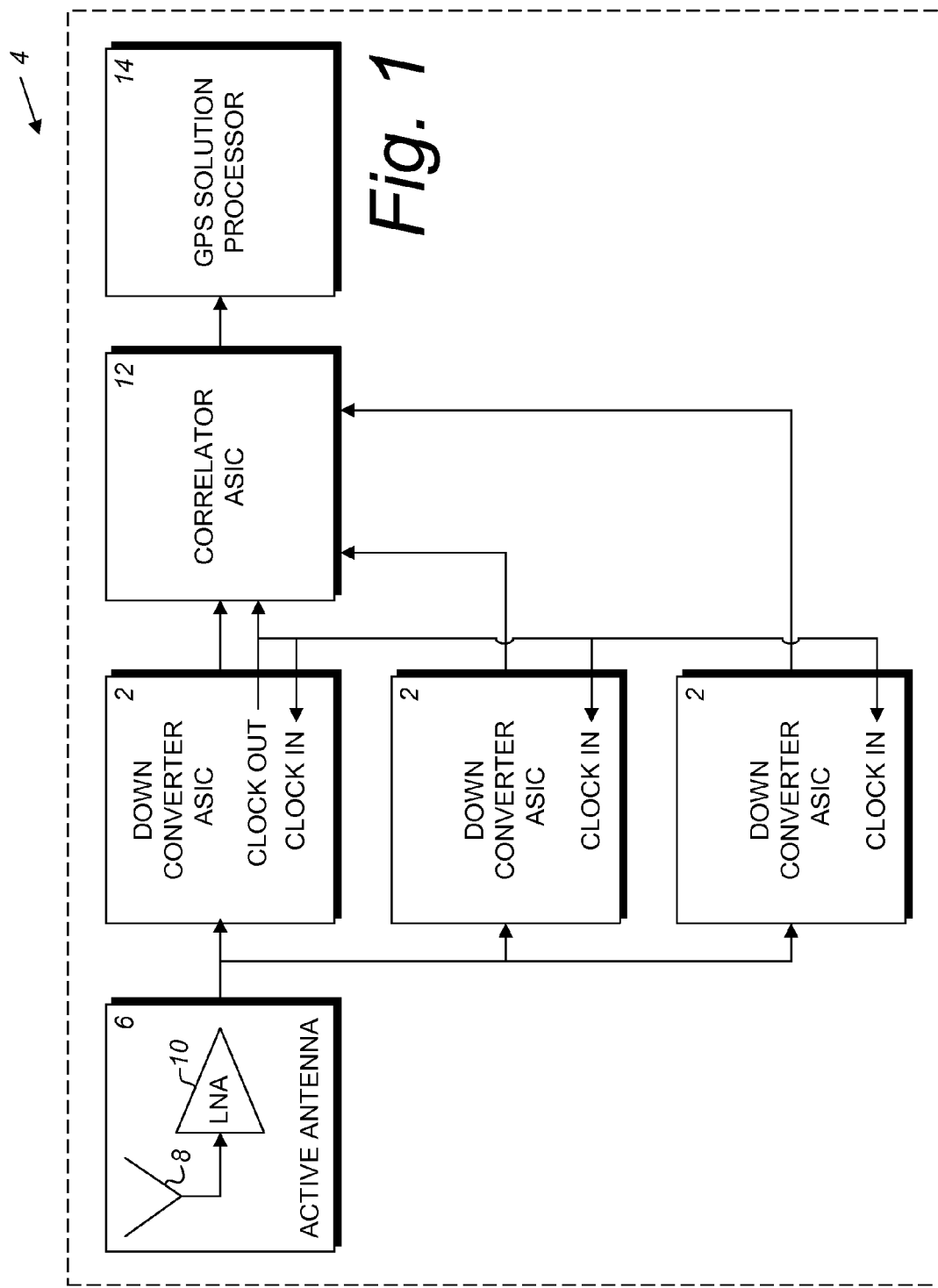
FIG. 1 is a block diagram of a multi-frequency GNSS receiver system embodying an aspect of the present invention.

The following table provides an example of GNSS frequency channel allocations, which could be implemented with the application specific integrated circuit (ASIC) down converter 2 as shown in FIG. 1:

TABLE 1

System Center Frequencies and Bandwidth Requirements

| Superband | System (signal) | $F_{center}$ (MHz) | Bandwidth (MHz) |
|---|---|---|---|
| 1 | SBAS | 1542 | 34 |
| 1 | GPS(L1CA) | 1575.42 | 24.0 |
| 1 | GPS(L1C) | 1575.42 | 24.0 |
| 1 | GPS(L1P) | 1575.42 | 24.0 |
| 1 | GLONASS(L1) | 1602.0 | 16 |
| 1 | Galileo(E1) | 1575.42 | 24.0 |
| 2 | GPS(L2P) | 1227.6 | 24.0 |
| 2 | GPS(L2C) | 1227.6 | 24.0 |
| 2 | GPS(L5) | 1176.45 | 24.0 |
| 2 | GLONASS(L2) | 1246.0 | 16 |
| 2 | Galileo(E5a) | 1176.45 | 24.0 |
| 2 | Galileo(E5b) | 1207.14 | 24.0 |
| 2 | Galileo(E5ab) | 1191.795 | 51.15 |

II. GNSS Superband ASIC with Multi-Frequency Down Conversion

Referring to FIG. 1 of the drawings in more detail, the reference numeral 2 generally designates an ASIC with multi-frequency down conversion embodying an aspect of the present invention. Without limitation on the generality of useful applications of the ASIC, a multi-frequency (e.g., dual-frequency) GNSS receiver system designated 4 is shown in FIG. 1 as an example of an application in which the present invention can be utilized. Such GNSS receiver systems can be employed in a wide range of useful applications, such as navigation, guidance and machine control in various industries, including precision farming, crop dusting, marine navigation, shipping, transportation, mining and manufacturing.

The receiver system 4 includes an antenna subsystem 6, which can comprise a passive antenna 8 connected to a low noise amplifier (LNA) 10. Active antennas may be tuned to specific GNSS frequencies, such as L1, L2, L5, etc. or tuned to accommodate superbands for multi-GNSS applications. The antenna subsystem 6 produces GNSS signals, which are input to one or more ASICs 2. The output of the ASIC 2 is received by an ASIC correlator 12, which can include a pseudo-range engine, and which provides input to a GNSS solution processor 14. The solution processor 14 can be connected to other components, such as graphical user interfaces (GUIs), autosteering, etc. Still further, satellite augmentation systems (SASs) of various types, including free services such as the Wide Area Augmentation System (WAAS) and Omnistar (paid subscription service) can be used for enhancing the accuracy of the system 4 by providing GNSS corrections.

Figure 2:
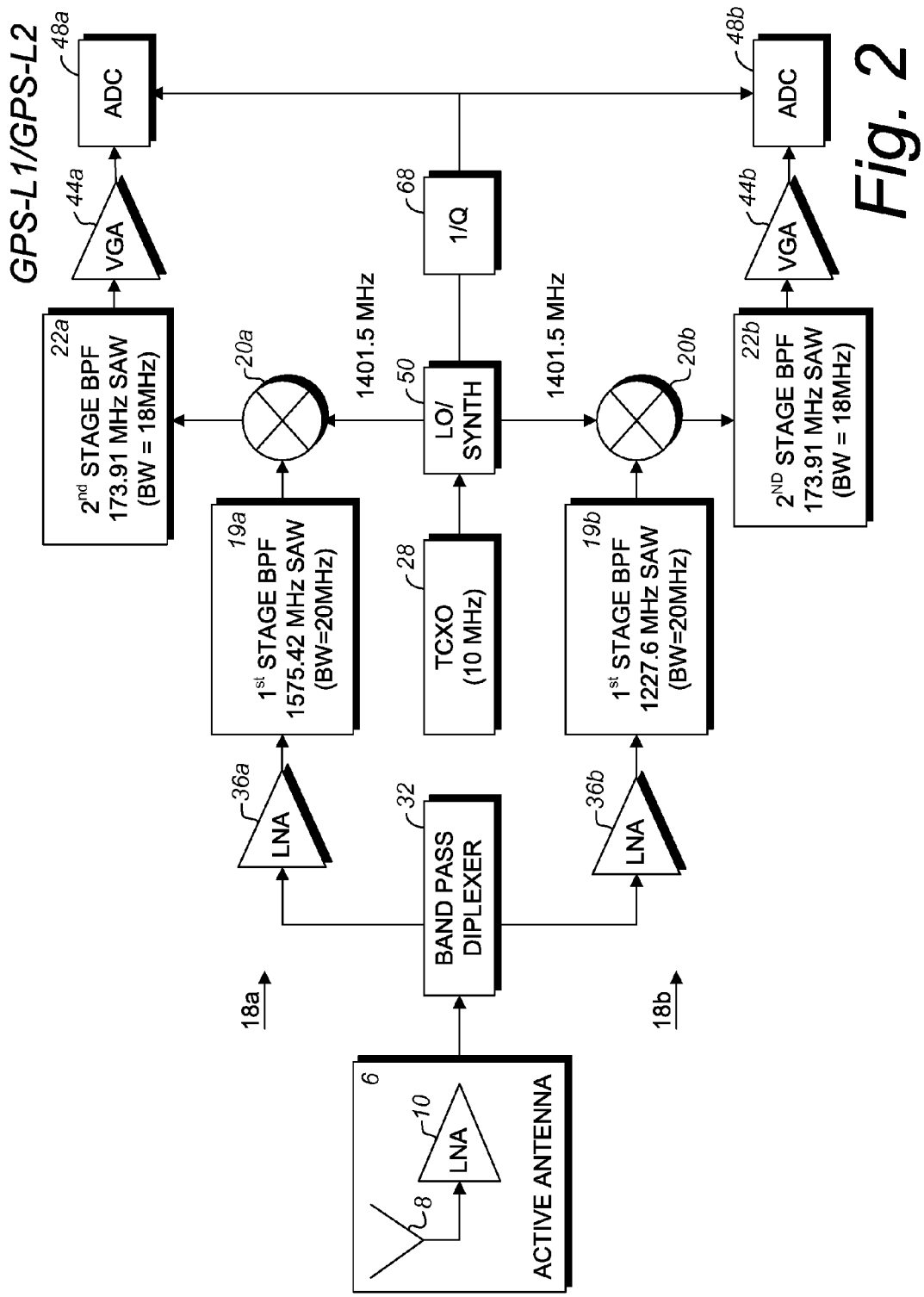
FIG. 2 is schematic diagram of a down converter of the GNSS receiver system, shown configured for GPS L1/L2.

FIG. 2 shows a diagram of the ASIC 2 down converting GPS L1 and L2 ranging signals, representing a possible use of the present invention. The signals are received from the LNA 10 and divided by a band pass diplexer 32 (or a multiplexer for accommodating more than 2 GNSS signal ranges) for proceeding along separate signal paths 18a, corresponding to L1 centered at 1575.42 MHz, and 18b, corresponding to L2 centered at 1227.60 MHz. First stage surface acoustic wave (SAW) filters 19a,b have bandwidths of 20 MHz, for example, and are centered at these frequencies. The SAW filter outputs are received by respective high side and low side mixers 20a,b, which provide output to second stage SAW filters 22a,b with bandwidths of 18 MHz, for example, and are centered at 173.91 MHz. Variable gain amplifiers (VGAs) 44a,b receive the output from the second stage SAW filters 22a,b and are connected to analog-to-digital converters (ADCs) 48a,b. The signal paths 18a,b share a common synthesizer providing a common local oscillator signal (collectively LO/Synth 50) to low side and high side mixers 20a,b at 1401.5 MHz. LO/Synth 50 is also connected to a temperature compensated crystal oscillator (TCXO) 28 (10 MHz). The LO/Synth 50 provides an input to the Divide by Q (1/Q) divider 68 which provides the sample clock input to the ADCs 48a,b.

Figure 3:
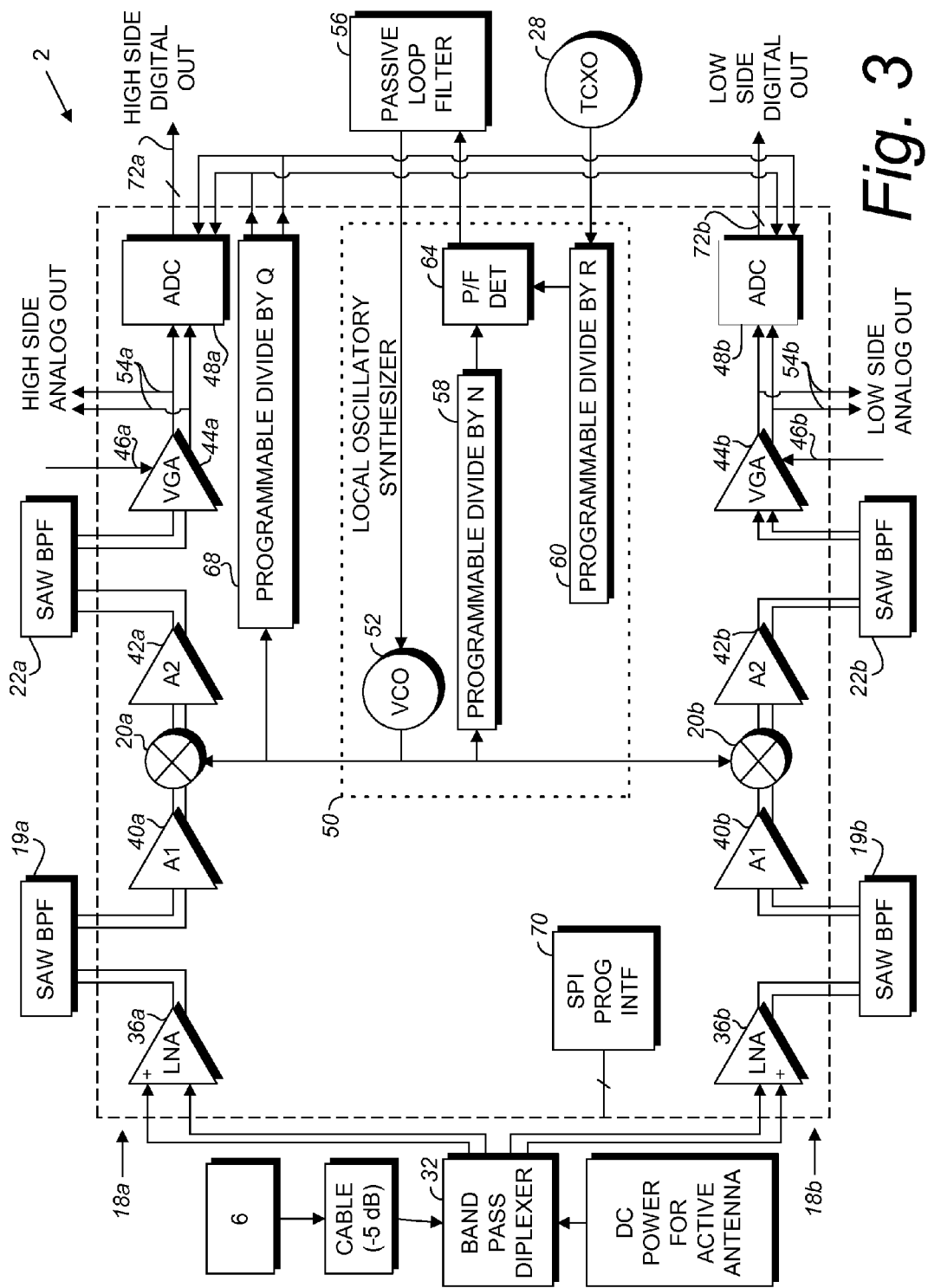
FIG. 3 is a schematic diagram of the down converter application specific integrated circuit (ASIC).

FIG. 3 shows the general IC configuration of the ASIC 2, configured for operation as a down converter with input from an active antenna 6 with a gain of, for example, +30 dB, which is connected to a band pass diplexer 32 providing GNSS signals for processing via respective signal paths 18a,b, including LNAs 36a,b connected to the diplexer 32 and to the first stage SAW band pass filters 19a,b, which are preferably external to the ASIC 2. RF amplifiers 40a,b (A1) receive signals from the SAW band pass filters 19a,b respectively and are connected to the mixers 20a,b, which are connected to intermediate frequency (IF) amplifiers 42a,b (A2). The second stage band pass filters 22a,b receive signals from the IF amplifiers 42a,b and provide signal inputs to variable gain amplifiers (VGAs) 44a,b, which are connected to and controlled by automatic gain control (AGC) signals 46a,b. The variable gain amplifiers 44a,b provide signal inputs to the analog-to-digital converters (ADCs) 48a,b, which respectively provide the digital outputs 72a,b from the high and low sides of the ASIC 2 corresponding to the high and low signal paths 18a,b. The variable gain amplifiers 44a,b also provide analog outputs 54a,b from the high and low sides of the ASIC 2 corresponding to the high and low signal paths 18a,b.

III. LO/Synth 50

A common local oscillator/synthesizer (LO/Synth) 50 drives both signal paths 18a,b. The LO/Synth 50 can comprise a synthesizer including a voltage controlled oscillator (VCO) 52 connected to the mixers 20a,b and an external passive loop filter 56. The LO/Synth 50 also includes a Programmable Divide by N (1/N) 58 connected to the VCO 52 and the phase/frequency detector 64. The LO/Synth 50 also includes a Programmable Divide by R (1/R) 60 which is connected to a phase/frequency detector (P/F Det) 64, which receives signals from the external temperature controlled crystal oscillator (TCXO) 28. The analog to digital clock divider Programmable Divide by Q (1/Q) 68 is connected to the mixers 20a,b and to the analog-to-digital converters (ADCs) 48a,b. A serial peripheral programming interface (SPI) 70 is provided for interfacing with external devices whereby the operation of the down converter 2 can be externally controlled by preprogramming such variables as "divide by" values, on/off switching and other components controls. Moreover, the external band pass filters 19a,b and 22a,b enable a relatively "universal" down converter 2 to be utilized in various receiver systems accommodating a wide range of current and future GNSSs. Such receiver systems 4 can include multiple band pass filters and other components external to the ASIC 2 whereby the system can be switched among various filter combinations for multi-frequency operation. Such switching can occur automatically, e.g., via software operation selecting the best available satellite constellations, or manually by an operator based on current satellite availability. Respective high and low side digital outputs 72a,b provide output "words," which can comprise 4 bit digital signals output from the ADCs 48a,b. Respective high and low side analog outputs 54a,b, provide analog outputs which can be connected to external analog to digital converters that provide higher bit resolution for example, than the on-chip analog to digital converters ADCs 48a,b. The ASIC 2 in the GNSS receiver system 4 provides a number of features and accommodates a number of functions, which include the following:

The system 4 simultaneously down converts two RF channels to a first, analog IF frequency.

The system 4 uses external matching components for the RF input to permit operation at either superband.

Signals in each RF signal path 18a,b are differential allowing common mode rejection of interfering signals.

The phase noise of the LO/Synth 50 can be extremely low and the LNAs 36a,b and RF amplifiers 40a,b have higher bias points and linearity than many commercially available devices.

The system 4 provides two analog-to-digital converters and the required ADC sample clock to support IF sub-sampling of both analog IF signals.

Each system 4 has synchronization means to permit placing multiple devices in a receiver to down convert multiple pairs of signals in two superbands.

Each system 4 has RF signal path bandwidths wide enough such that each path 18a,b may convert all or part of a super band of frequencies to a lower IF frequency and digitize them in the ADCs 48a,b. For example, signal path 18a could down convert GPS L1 and GLONASS L1 signals while signal path 18b could down convert GPS L2 and GLONASS L2 signals.

The ADC sample clock is generated by dividing the down converter synthesizer (LO/Synth) 50 output frequency by an integer. This requires less power and is less prone to self interference than adding a second synthesizer to generate the ADC sample clock. This also avoids low frequency beat notes being generated between the VCO 52 and the ADC clock. Low frequency beat notes would greatly increase the amount of power supply decoupling required.

This sample clock can be provided to other DCAs 2 in order to synchronize the ADC sampling clocks of all signals being down-converted.

All band limiting filters can be located off-chip. Off-chip filters and a relatively high first IF frequency allow the use of wider band filters for improved multipath mitigation and high end performance superior to typical commercially available devices.

The noise bandwidth of the system 4 is set by the band pass filters 22*a,b* in the first IF. This filter may be external to the ASIC 2 or a switchable filter internal to the ASIC 2. The switchable filter could be narrower than the external filter and used in weak signal or interference situations.

The synthesizer passive loop filter 56 is off-chip, allowing flexibility in choosing a synthesizer PLL loop bandwidth. The Synthesizer VCO 52 tunable resonant circuit is on-chip reducing noise and interference problems associated with transporting the resonator signals over bond wires to and from the ASIC 2 die.

The system 4 uses the temperature compensated crystal oscillator (TCXO) 28 for generating its own reference signal, as opposed to less accurate crystals.

All frequency dividers in the system 4 are programmable via the SPI 70.

The synthesizer LO/Synth 50 frequency can be programmed to a large number of different frequencies. It is not constrained to be a fixed ratio of the reference frequency. There is a frequency divider provided for the reference signal.

Portions of the system 4 can be selectively (via the SPI 70) turned on/off to save power. For example, portions of the ASIC 2 corresponding to one of the signal paths 18*a,b* can be turned off.

The system 4 outputs are configurable to be 4 bit linear output or 2 bit Lloyd-Max output format. 4 bit outputs allow interference mitigation techniques to be implemented and provide lower C/No implementation loss than 2 bit converters used in commercially available devices.

The system 4 can accept clock (sampling) signals from an internal or an external sample clock. A common or an external sample clock can enable multiple ASICs to use the same sample clock to sample multiple (super) bands of GNSS signals (FIG. 1).

The internally generated ADC sample clock has very low jitter allowing 9 bit ENOB performance from external analog-to-digital converters.

The ADCs 48*a,b* have low inherent aperature jitter allowing digital sub-sampling techniques to be employed resulting in lower ADC clock frequency requirements.

The system 4 provides high channel to channel isolation so that interference in one channel does not interfere with operation of the other channel.

The system 4 is capable of down converting two signals from the same superband (e.g., GPS-L1/GPS-L5 (FIG. 4), GPS-L1/GLONASS-L1 (FIG. 5), etc.).

Figure 4:
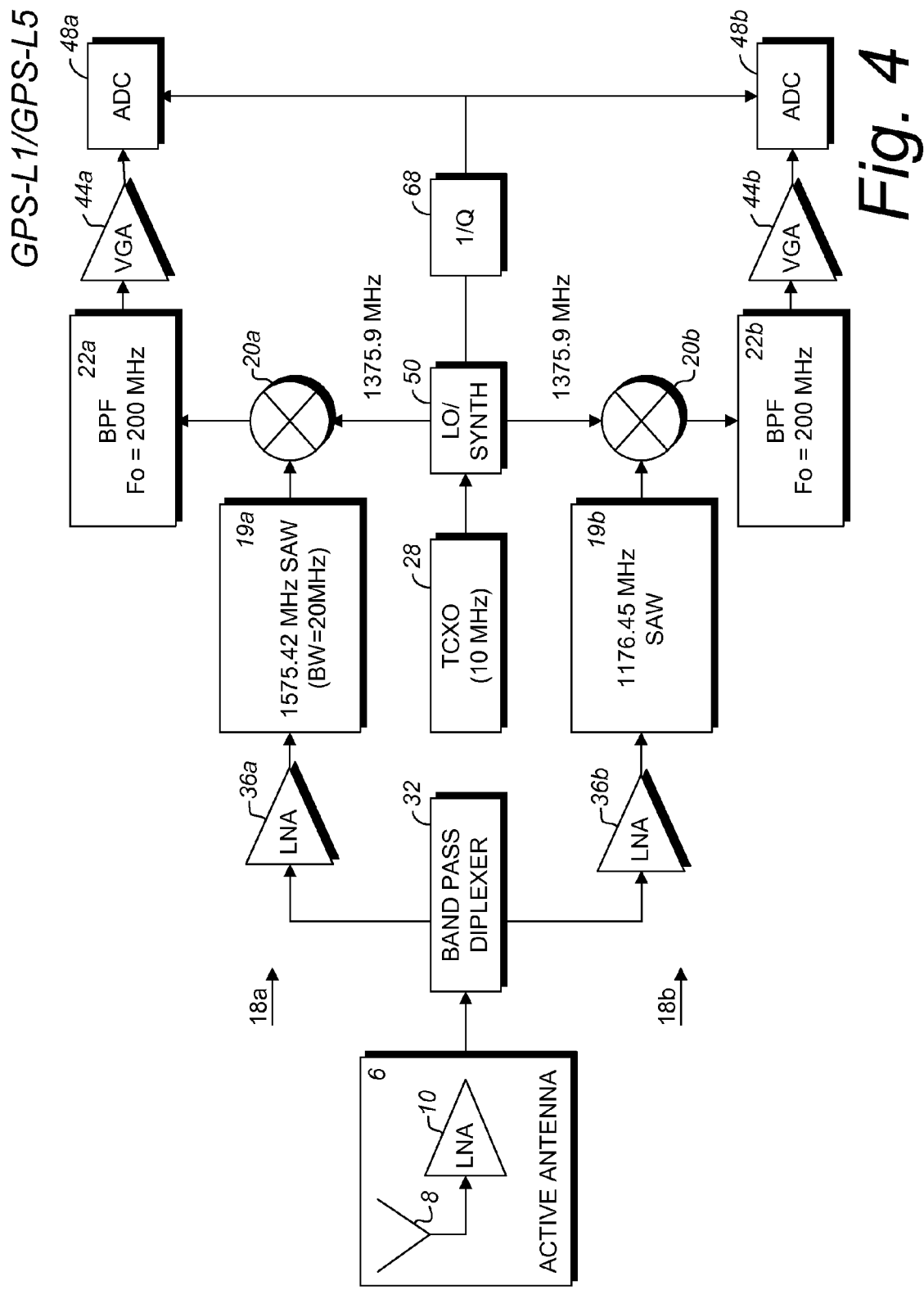
FIG. 4 is a schematic diagram of an alternative embodiment of the present invention, shown configured for GPS-L1/GPS-L5.

FIG. 4 is a schematic diagram of an alternative embodiment of the present invention, shown configured for GPS-L1/GPS-L5. The SAW BPF 19*b*, 22*a*, 22*b* frequencies are changed accordingly. Advantageously, the same SAW BPF 19*a* (1575.42 MHz) can be used for GPS-L1/GPS-L2 (FIG. 2) and GPS-L1/GPS-L5 (FIG. 4). FIG. 5 is a schematic diagram of another alternative embodiment of the present invention, shown configured for GPS-L1/GLONASS-L1. The frequencies of the SAW BPFs 19*a*, 19*b*, 22*a*, 22*b* and the LO/Synth 50 are changed accordingly. Because the SAW BPFs are external components, the same ASIC 2 as described above can be used for these and other alternative embodiment systems. Of course, other GNSS superband signal pairs can also be accommodated by the ASIC 2 by reconfiguring the external component SAW BPFs.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. An integrated circuit (IC) for simultaneously down converting global navigation satellite system (GNSS) signals in first and second signal frequency bands, which circuit comprises:
    first and second signal paths receiving GNSS signals corresponding to the first and second signal frequency bands respectively;
    a common local oscillator/synthesizer (LO/Synth) connected to and driving each of said signal paths;
    the LO/Synth including a common programmable divider providing a sample clock signal to each of said signal paths and adapted for simultaneously down converting said signals to a lower intermediate frequency (IF);
    first and second analog-to-digital converters (ADCs) each connected to said common programmable divider, each said ADC receiving a down-converted signal as an input and providing a digital signal as an output;
    each said signal path being adapted for connection to and receiving input from a multiplexer with multiple outputs and located externally to said IC;
    first and second low-noise amplifiers (LNAs) in said first and second signal paths respectively and each electrically connected to a respective multiplexer output; and
    said first and second signal paths being adapted for connection to first and second band pass filters (BPFs) with said first and second BPFs being located externally to said IC and adapted for connection to said first and second LNAs respectively.

2. The IC according to claim 1 wherein each said signal frequency band comprises a superband of frequencies associated with multiple GNSSs.

3. The IC according to claim 2, which includes:
    first and second mixers electrically connected to said LO/Synth in said first and second signal paths respectively and adapted for connection to said first and second BPFs respectively.

4. The IC according to claim 3 wherein the noise bandwidth of the system is set by the BPF in the first IF.

5. The IC according to claim 4 wherein:
    the ADC sample clock supports IF sub-sampling of the analog IF signal simultaneously from both ADCs; and
    said ADC sample clock is generated by dividing the down converter LO/Synth output by an integer.

6. The IC according to claim 2 wherein the GNSSs are chosen from among the group comprising: SBAS, GPS, GLONASS and Galileo.

7. The IC according to claim 5, which includes:
    a serial peripheral programming interface (SPI) adapted for connection to a device located externally to said IC and adapted for controlling said SPI; and
    said frequency dividers in the IC being externally programmable via the SPI.

8. The IC according to claim 1 wherein:
    each RF channel has only one IF.

9. The IC according to claim 7, which is adapted for connection to an external power switching device connected to said SPI and adapted for deactivating portions of said circuit and thereby reducing power consumption.

10. The IC according to claim 9, which is adapted for connection to external matching components connected to the RF input, said external matching components being adapted for matching signals to respective super bands.

11. The IC according to claim 10, which includes:
said first and second BPFs comprising first stage BPFs; and
a first second stage BPF and a second second stage BPF in said first and second signal paths respectively and adapted for electrical connection to said first and second mixers respectively.

12. The IC according to claim 3 wherein said BPFs comprise surface acoustic wave band pass filters (SAW BPFs).

13. The IC according to claim 12, which includes:
first and second variable gain amplifiers (VGAs) in said first and second signal paths respectively and electrically connected to said second stage BPFs; and
said first and second ADCs being electrically connected to said first and second VGAs respectively.

14. The IC according to claim 1 wherein the signals in each said RF signal path are differential.

15. The IC according to claim 13, wherein:
said LO/Synth, said SPI, said mixers, said VGAs and said ADCs are collectively contained in an integrated circuit (IC);
said BPFs are located externally to said IC; and
said IC is adapted for electrical connection with said external BPFs.

16. The IC according to claim 1, which includes:
channel to channel isolation means for preventing interference in one channel from interfering with operation of the other channel.

17. The IC according to claim 15, which includes:
said LO/Synth being adapted for electrical connection to a passive loop filter located externally to the IC.

18. The IC according to claim 15, which includes:
an ADC sample clock input to said IC enabling multiple circuits to use a shared sample clock to sample multiple GNSS signals.

19. The IC according to claim 15, which includes:
said LO/Synth including a programmable divide by integer R component; and
said LO/Synth being adapted for electrical connection to an external temperature controlled crystal oscillator (TCXO) connected to said programmable divide by integer R component and adapted for providing a reference signal.

20. The IC according to claim 1, which includes:
an ADC sample clock supporting IF subsampling of both analog IFs.

21. The IC according to claim 20 wherein an ADC sample clock is generated by dividing a down-converter ASIC output frequency by an integer.

22. The IC according to claim 1, which includes:
said IC being adapted for connection to at least one additional IC adapted for converting multiple pairs of GNSS signals in two super bands; and
said ICs being adapted for connection to a common sample clock for synchronizing the ADC sampling clocks for all signals being down converted.

23. The IC according to claim 22 wherein said sample clock signal is generated by dividing the LO/Synth output by an integer.

24. The IC according to claim 1, which is adapted for connection to a multiplexer adapted for receiving GNSS signals as input and providing output consisting of at least said first and second signal bands with first and second center frequencies respectively.

25. The IC according to claim 1, which includes:
a serial programming interface (SPI) connected to said signal paths and adapted for connection to an external device for externally controlling the circuit.

26. The IC according to claim 1, which includes:
said LO/Synth being programmable for tuning said circuit to multiple GNSS superbands; and
said LO/Synth includes a frequency divider and is adapted for providing an ADC sample clock output.

27. The IC according to claim 20 wherein:
the ADC outputs are configurable to be either four-bit linear output format or two-bit Lloyd-Max output format.

28. The IC according to claim 1, which includes:
differential IF signal paths.

29. The IC according to claim 1, which includes:
RF and IF signal paths with sufficient bandwidth to down convert all or portions of upper and lower super bands allowing simultaneous reception of multiple GNSSs, including GPS L1 and GLONASS L1 in signal path 1 and GPS L2 and GLONASS L2 in signal path 2.

30. A GNSS receiver system for multiple frequencies, which system includes:
an integrated circuit (IC) for simultaneously down converting GNSS signals in first and second signal frequency bands;
first and second signal paths receiving GNSS signals corresponding to the first and second signal frequency bands respectively;
a common LO/Synth in said IC and connected to and driving each of said signal paths;
the LO/Synth including a common programmable divider providing a sample clock signal to each of said signal paths and adapted for simultaneously down converting said signals to a lower IF;
first and second ADCs in said IC and each connected to said common programmable divider, each said ADC receiving a down-converted signal as an input and providing a digital signal as an output;
said IC adapted for connections with elements external to said IC;
first and second LNAs located in said IC within said first and second signal paths respectively and each electrically connected to a respective multiplexer output;
first and second first stage BPFs connected to said first and second signal paths respectively;
first and second second stage BPFs connected to said first and second signal paths respectively;
said first stage BPFs being connected to said first and second LNAs respectively;
a serial peripheral programming interface (SPI) adapted for connection to a device located externally to said IC and adapted for controlling said SPI; and
said frequency dividers in the IC being externally programmable via the SPI.

31. The system according to claim 30, which includes:
an active antenna;
multiple downconverter ICs receiving input from an active antenna and providing output to an application-specific integrated circuit ASIC;
a common clock connected to said ICs;
said ICs providing input to a correlator application-specific integrated circuit (ASIC); and
a GNSS solution processor connected to and receiving output from said correlator ASIC.

32. The system according to claim 30, which is configured for a GNSS signal pair chosen from among the GNSS signal pairs including:
- GPS-L1/GPS-L2 with a first first stage BPF frequency of 1575.42 MHz, a second first stage BPF frequency of 1227.6 MHz, a first second stage BPF frequency of 173.91 MHz, a second second stage BPF frequency of 173.91 MHz and an LO/Synth output frequency of 1401.5 MHz;
- GPS-L1/GPS-L5 with a first first stage BPF frequency of 1575.42 MHz, a second first stage BPF frequency of 1176.45 MHz, a first second stage BPF frequency of 200 MHz, a second second stage BPF frequency of 200 MHz and an LO/Synth output frequency of 1375.9 MHz; and
- GPS-L1/GLONASS-L1 with a first first stage BPF frequency of 1602 MHz, a second first stage BPF frequency of 1575.42 MHz, a first second stage BPF frequency of 200 MHz, a second second stage BPF frequency of 173.91 MHz and an LO/Synth output frequency of 1375.9 MHz.

33. A GNSS receiver system for multiple frequencies, which system includes:
- an integrated circuit (IC) for simultaneously down converting GNSS signals in first and second signal frequency bands:
- first and second signal paths receiving GNSS signals corresponding to the first and second signal frequency bands respectively;
- a common LO/Synth in said IC and connected to and driving each of said signal paths;
- the LO/Synth including a common programmable divider providing a sample clock signal to each of said signal paths and adapted for simultaneously down converting said signals to a lower IF;
- first and second ADCs in said IC and each connected to said common programmable divider, each said ADC receiving a down-converted signal as an input and providing a digital signal as an output;
- said IC adapted for connections with elements external to said IC;
- first and second LNAs located in said IC within said first and second signal paths respectively and each electrically connected to a respective multiplexer output;
- first and second first stage BPFs connected to said first and second signal paths respectively;
- said first stage BPFs being connected to said first and second LNAs respectively;
- said first stage BPFs and said second stage BPFs being electrically connected to said first and second mixers respectively;
- a serial peripheral programming interface (SPI) adapted for connection to a device located externally to said IC and adapted for controlling said SPI;
- said frequency dividers in the IC being externally programmable via the SPI;
- matching components external to said IC connected to the RF input of said IC adapted for external connections, said external matching components adapted for matching signals to respective super bands;
- each said signal frequency band comprises a super band of frequencies associated with multiple GNSSs;
- said GNSSs are chosen from among the group comprising: SBAS, GPS, GLONASS and Galileo;
- first and second mixers located within said first and second signal paths respectively and electrically connected to said first and second BPFs and said LO/Synth respectively;
- said first and second BPFs comprising first stage BPFs;
- a first second stage BPF and a second second stage BPF in said first and second signal paths respectively and electrically connected to said first and second mixers respectively;
- first and second VGAs in said first and second signal paths respectively and electrically connected to said second stage BPFs;
- first and second ADCs in said first and second signal paths respectively and electrically connected to said first and second VGAs respectively;
- each of said first and second ADCs receiving an analog signal input from a respective VGA and providing a digital signal output;
- each said LO/Synth, said SPI, said mixers, said VGAs and said ADCs being collectively contained in said IC;
- said BPFs being located externally to said IC;
- said sample clock signal supporting IF subsampling of the analog IF signals in said first and second signal paths;
- said sample clock signal being generated by dividing the LO/Synth output by an integer;
- an active antenna providing output to said IC;
- said IC providing input to a correlator application-specific integrated circuit (ASIC); and
- a GNSS solution processor connected to and receiving output from said correlator ASIC.

34. An integrated circuit (IC) for simultaneously down converting global navigation satellite system (GNSS) signals in first and second signal frequency bands, which circuit comprises:
- first and second signal paths receiving GNSS signals corresponding to the first and second signal frequency bands respectively;
- a common local oscillator/synthesizer (LO/Synth) connected to and driving each of said signal paths;
- the LO/Synth including a common programmable divider providing a sample clock signal to each of said signal paths and adapted for simultaneously down converting said signals to a lower intermediate frequency (IF);
- first and second analog-to-digital converters (ADCs) each connected to said common programmable divider, each said ADC receiving a down-converted signal as an input and providing a digital signal as an output;
- each said signal frequency band comprises a superband of frequencies associated with multiple GNSSs;
- each said signal path being adapted for connection to and receiving input from a multiplexer with multiple outputs and located externally to said IC;
- first and second low-noise amplifiers (LNAs) in said first and second signal paths respectively and each electrically connected to a respective multiplexer output;
- said first and second signal paths being adapted for connection to first and second band pass filters (BPFs) with said first and second BPFs being located externally to said IC and adapted for connection to said first and second LNAs respectively; and
- first and second mixers electrically connected to said LO/Synth in said first and second signal paths respectively and adapted for connection to said first and second BPFs respectively.

\* \* \* \* \*